(12) United States Patent
Toyoda et al.

(10) Patent No.: US 7,605,507 B2
(45) Date of Patent: Oct. 20, 2009

(54) MOTOR APPARATUS

(75) Inventors: Yugo Toyoda, Kosai (JP); Kenji Kashima, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 293 days.

(21) Appl. No.: 11/675,473

(22) Filed: Feb. 15, 2007

(65) Prior Publication Data
US 2007/0188032 A1   Aug. 16, 2007

(30) Foreign Application Priority Data
Feb. 16, 2006   (JP)   ............... 2006-039292

(51) Int. Cl.
*H02K 11/00* (2006.01)
*H02K 7/00* (2006.01)
*H02K 49/00* (2006.01)

(52) U.S. Cl. ...................... 310/75 R; 310/92
(58) Field of Classification Search ............... 310/68 B, 310/75 R, 76, 78, 92, 100
See application file for complete search history.

(56) References Cited

U.S. PATENT DOCUMENTS

| | | | |
|---|---|---|---|
| 6,229,233 B1* | 5/2001 | Torii et al. ................ 310/75 R |
| 6,242,824 B1* | 6/2001 | Torii et al. .................... 310/42 |
| 6,550,599 B2* | 4/2003 | Kudou et al. ............. 192/223.2 |
| 6,727,613 B2* | 4/2004 | Kawakami et al. ........ 310/75 R |
| 6,921,994 B2* | 7/2005 | Kawakami et al. ........ 310/75 R |
| 2004/0164629 A1* | 8/2004 | Kawakami et al. ........ 310/75 R |

FOREIGN PATENT DOCUMENTS

JP   2003-278784   2/2003

* cited by examiner

*Primary Examiner*—Quyen Leung
*Assistant Examiner*—Eric Johnson
(74) *Attorney, Agent, or Firm*—Marsh Fischmann & Breyfogle LLP

(57) ABSTRACT

A drive rotor has a coupled portion to which a coupling portion extending from a rotary shaft is loosely fitted. A driven rotor can be engaged with the drive rotor with respect to a rotating direction of the drive rotor. A restricting member is fixed to the rotary shaft so as to be integrally rotatable. In the case that the drive rotor is inclined with respect to the rotary shaft, the restricting member can be brought into contact with the drive rotor. Accordingly, it is possible to suppress an excessive looseness in a coupling mechanism.

7 Claims, 10 Drawing Sheets

MOTOR APPARATUS

BACKGROUND OF THE INVENTION

The present invention relates to a motor apparatus having a clutch for coupling a rotary shaft of the motor apparatus to a worm shaft.

Japanese Laid-Open Patent Publication No. 2003-278784 discloses a motor apparatus incorporated in a vehicle power window apparatus. As shown in FIG. 10A, if a motor main body 102 of the motor apparatus rotates a rotary shaft 101, a rotation of the rotary shaft 101 is transmitted to a worm shaft 103 of a deceleration portion 104 through a clutch 105.

As shown in FIG. 10B, the rotary shaft 101 rotates a drive rotor 111 in the clutch 105. If the drive rotor 111 rotates a driven rotor 112, the worm shaft 103 is rotated.

However, the clutch 105 prevents the rotation of the worm shaft 103 from being transmitted to the rotary shaft 101. In other words, if the worm shaft 103 intends to rotate in a state in which the rotary shaft 101 is stopped, the driven rotor 112 is engaged with a cylindrical collar 114 by a roller 115. In other words, a control surface 112a in the driven rotor 112 and an inner circumferential surface 114a of the collar 114 hold the roller 115. The collar 114 is fixed to a gear housing 113 in the deceleration portion 104. Accordingly, the driven rotor 112 cannot rotate, and the rotary shaft 101 does not rotate. A Hall element 121 attached to the gear housing 113 detects the rotation of the rotary shaft 101 by detecting an annular sensor magnet 122 fitted to an outer periphery of the drive rotor 111. A buffering member 123 made of an elastomer resin is arranged between the rotary shaft 101 and the drive rotor 111.

As shown in FIG. 10B, a coupling portion 101a extending from a distal end of the rotary shaft 101 is loosely fitted to a coupling hole 111a of the drive rotor 111. Accordingly, even if the drive rotor 111 is deviated from the rotary shaft 101 due to an assembly error of each of parts of the motor apparatus, an increase of a load in a radial direction applied to the drive rotor 111 and the rotary shaft 101 is suppressed. Accordingly, noise and vibration generated from the motor apparatus under rotation is suppressed. The description "the drive rotor 111 is axially deviated from the rotary shaft 101" includes a case that a first axis L1 corresponding to a center axis of the drive rotor 111 is inclined with respect to a second axis L2 corresponding to a center axis of the rotary shaft 101, and a case that the first axis L1 is displaced from the second axis L2 in a state in which the first axis L1 is in parallel to the second axis L2.

However, if a degree at which the drive rotor 111 is deviated from the rotary shaft 101 is increased, an excessive looseness in the clutch 105 tends to be increased, and the vibration and the noise of the motor apparatus tend to be increased.

SUMMARY OF THE INVENTION

An object of the present invention is to provide a motor apparatus which suppresses an excessive looseness in a coupling mechanism coupling a rotary shaft to a worm shaft.

In accordance with one aspect of the present invention, there is provided a motor apparatus including a motor main body, and a deceleration portion installed to the motor main body. The motor main body is provided with a rotary shaft. The deceleration portion has a worm shaft driven by the rotary shaft. The worm shaft is coaxially arranged with the rotary shaft. A coupling portion is provided in one end of the rotary shaft. A drive rotor has a coupled portion to which the coupling portion is loosely fitted. The drive rotor is integrally rotatable with the coupling portion. A driven rotor is integrally rotated with a worm shaft. The driven rotor can be engaged with the drive rotor, with respect to a rotating direction of the drive rotor. A coupling mechanism includes the drive rotor and the driven rotor. A restricting member is fixed to the rotary shaft so as to be integrally rotatable. In the case that the drive rotor is inclined with respect to the rotary shaft, the restricting member can be brought into contact with the drive rotor.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF PREFERRED EMBODIMENTS

A description will be given below of an embodiment obtained by specifying the present invention with reference to FIGS. 1 to 7.

Figure 1:
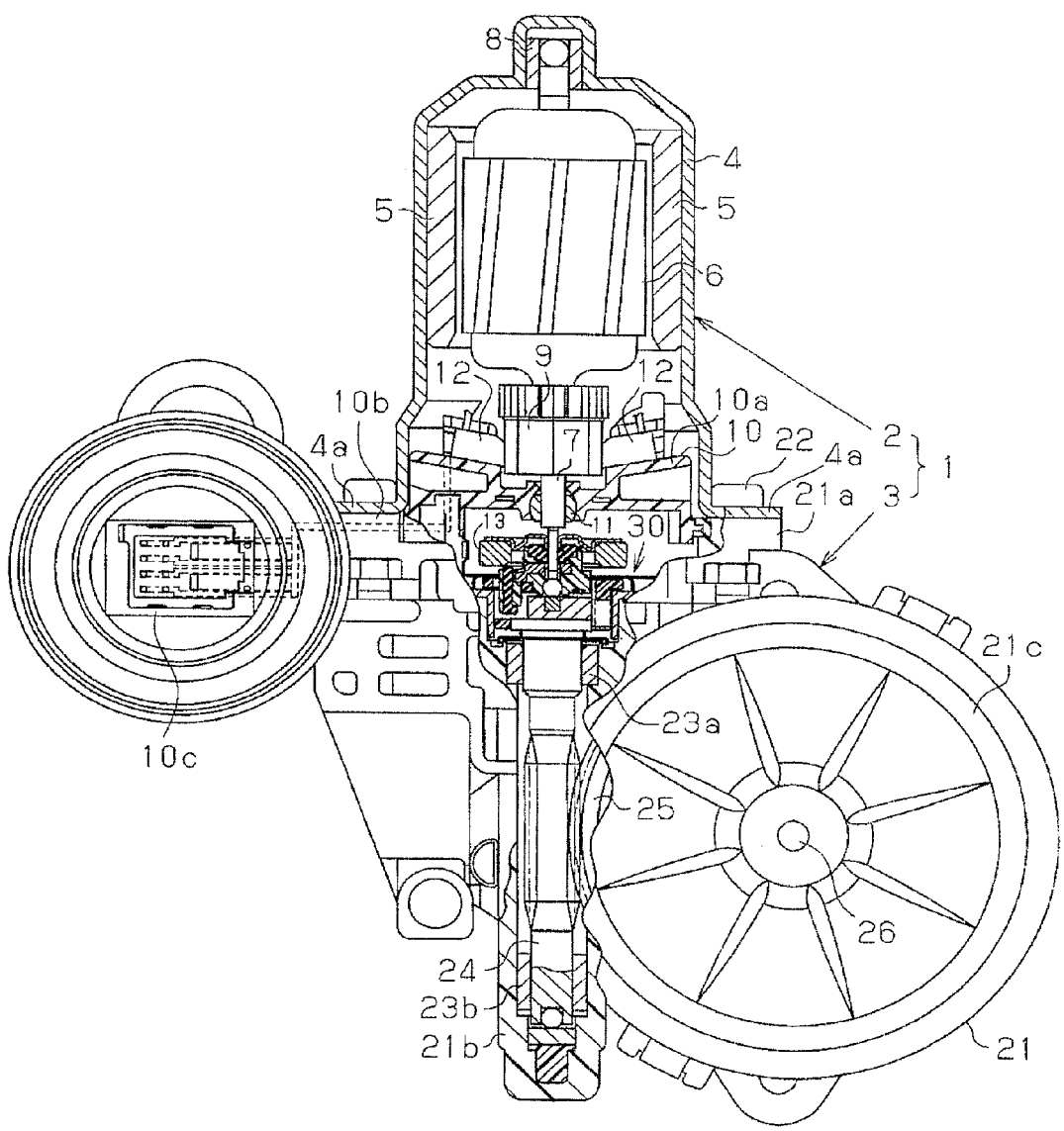
FIG. 1 is a vertical cross-sectional view of a motor apparatus in accordance with an embodiment of the present invention.

As shown in FIG. 1, a motor apparatus 1 in accordance with an embodiment is provided with a flat type motor main body 2, and a deceleration portion 3 installed to the motor main body 2. The motor apparatus 1 functions as a drive source of a vehicle power window apparatus.

The motor main body 2 is provided with a yoke 4 serving as a flat cylindrical yoke housing. The yoke 4 has a bottom portion, and an opening portion in an opposite side to the bottom portion. The opening portion of the yoke 4 is closed by a resin brush holder 10. The yoke 4 and the deceleration portion 3 hold the brush holder 10 therebetween. The yoke 4 accommodates an armature 6. The yoke 4 has a first bearing 8 rotatably supporting a proximal end of a rotary shaft 7 of the armature 6. The brush holder 10 has a second bearing 11 rotatably supporting a distal end of the rotary shaft 7. A commutator 9 is attached to the rotary shaft 7 between the second bearing 11 and the yoke 4. A distal end of the rotary shaft 7 has a coupling portion 7a protruding toward the deceleration portion 3 from the second bearing 11. In other words, the coupling portion 7a protrudes toward the deceleration portion 3 from the brush holder 10. The coupling portion 7a has two side surfaces which are in parallel to each other.

A pair of flanges 4a are formed in the opening portion of the yoke 4. The flanges 4a extend in a longitudinal direction in a cross section perpendicular to an axial direction of the yoke 4. A plurality of magnets 5 facing each other in such a manner as to hold the armature 6 are firmly attached to an inner surface of the yoke 4.

The brush holder 10 has a holder main body 10a covering the opening portion of the yoke 4, an extension portion 10b extending in a radial direction from the holder main body 10a, and a connector portion 10c provided in a distal end of the extension portion 10b. The holder main body 10a, the extension portion 10b and the connector portion 10c are integrally formed.

Figure 2:
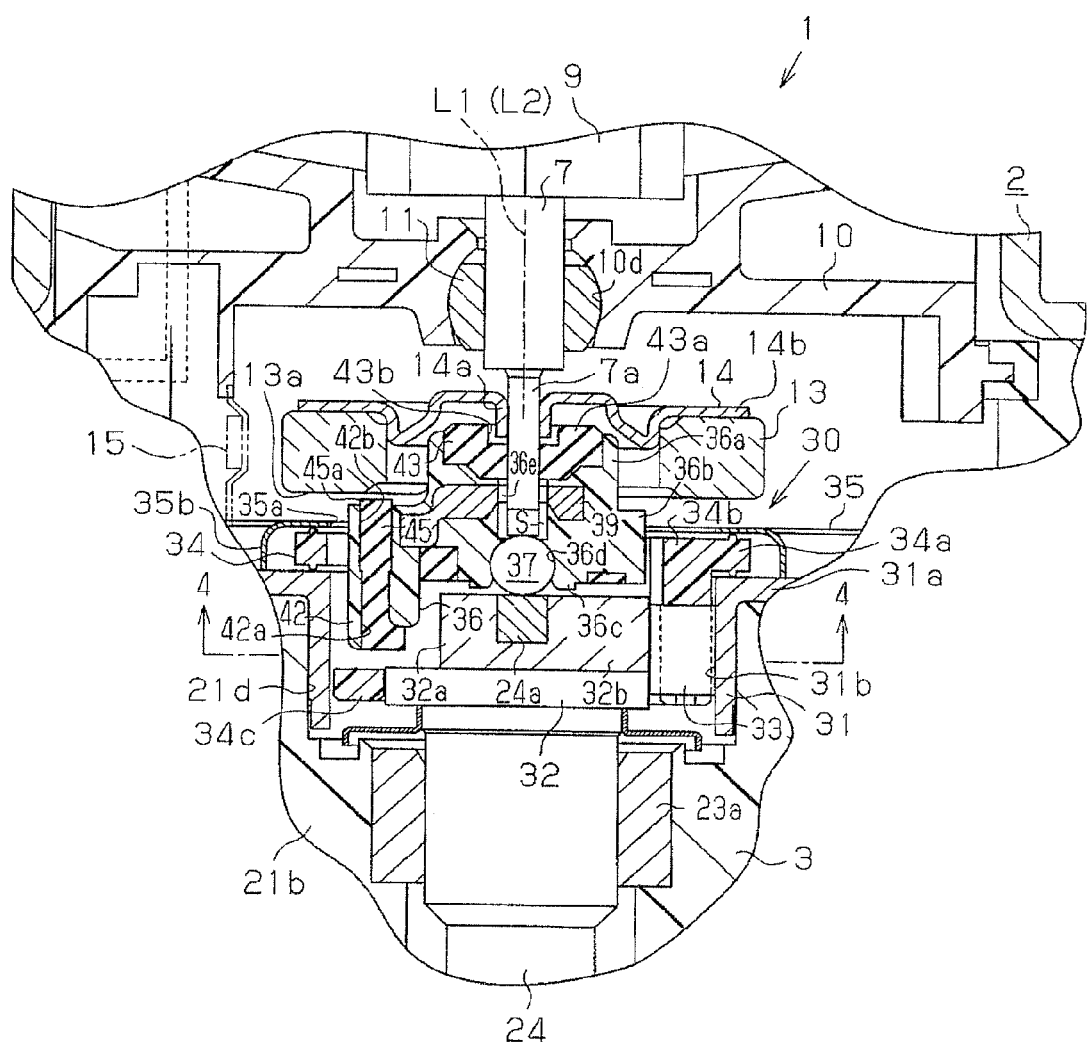
FIG. 2 is an enlarged view of a peripheral portion of a clutch shown in FIG. 1.

As shown in FIGS. 1 and 2, a center portion of the holder main body 10a has a center hole 10d for holding the second bearing 11.

As shown in FIG. 1, the holder main body 10a holds a pair of brushes 12. Both brushes 12 are brought into slidable contact with an outer circumferential surface of the commutator 9 in the inner portion of the yoke 4. Each of the brushes 12 is connected to a control circuit (not shown) by a terminal (not shown) insert molded in the brush holder 10. The control circuit supplies an electric current for driving the motor apparatus 1 to each of the brushes 12. The connector portion 10c extends perpendicularly to a paper surface of FIG. 1, and can be fitted and attached to an external connector (not shown).

As shown in FIG. 2, a disk-shaped support member 14 is fixed to the coupling portion 7a. The support member 14 supports an annular sensor magnet 13. The sensor magnet 13 is integrally rotated with the coupling portion 7a. The sensor magnet 13 has a restricting surface 13a directed toward an opposite direction to the motor main body 2 with respect to the support member 14.

The support member 14 has a fixed tube 14a extending in an axial direction, and an annular support plate 14b extending to an outer side in a radial direction from the fixed tube 14a. The support plate 14b extends from an end portion directed to the motor main body 2 of the fixed tube 14a. The coupling portion 7a is press fitted to the fixed tube 14a. The sensor magnet 13 is fixed to a surface of the support plate 14b directed to the opposite direction to the motor main body 2.

The deceleration portion 3 has a Hall element 15 facing an outer circumferential surface of the sensor magnet 13. The Hall element 15 detects a change of a magnetic flux caused by the rotation of the sensor magnet 13, and outputs a position detecting signal corresponding to the magnetic flux change to the control circuit. The control circuit detects a rotational position of the rotary shaft 7 on the basis of the position detecting signal.

As shown in FIG. 1, the deceleration portion 3 is provided with a gear housing 21 made of a resin. The gear housing 21 accommodates various parts of the deceleration portion 3, that is, a third bearing 23a, a fourth bearing 23b, a worm shaft 24, a worm wheel 25, and an output shaft 26.

The gear housing 21 has a fixed portion 21a fixed to the flange 4a of the yoke 4, a worm accommodating portion 21b accommodating the worm shaft 24, and a wheel accommodating portion 21c accommodating the worm wheel 25. The fixed portion 21a, the worm accommodating portion 21b and the wheel accommodating portion 21c are integrally formed.

The fixed portion 21a has such a shape as to face the flange 4a. The fixed portion 21a is fixed to the flange 4a by a screw 22. Accordingly, the fixed portion 21a and the flange 4a hold the extension portion 10b of the brush holder 10.

The cylindrical worm accommodating portion 21b extends on an extension of the rotary shaft 7. The worm accommodating portion 21b accommodates the worm shaft 24, and the third bearing 23a and the fourth bearing 23b which rotatably support the worm shaft 24. A clutch 30 is provided in a portion adjacent to the motor main body 2, in an inner portion of the worm accommodating portion 21b. The clutch 30 serving as a coupling mechanism can couple the rotary shaft 7 to the worm shaft 24. The clutch 30 allows the worm shaft 24 to be coaxial with the rotary shaft 7.

The structure in which "the worm shaft 24 is coaxial with the rotary shaft 7" includes a case that a first axis L1 corresponding to a center axis of the rotary shaft 7 is identical with a second axis L2 corresponding to a center axis of the worm shaft 24, and a case that the first axis L1 is deviated from the second axis L2 within a range that the coupling portion 7a can be coupled to a coupled portion (36e). The structure in which "the first axis L1 is deviated from the second axis L2" includes a case that the first axis L1 is inclined with respect to the second axis L2, and a case that the first axis L1 is displaced from the second axis L2 in a state in which the first axis L1 is in parallel to the second axis L2.

The third bearing 23a is adjacent to the clutch 30. The fourth bearing 23b is positioned at an opposite side to the clutch 30 with respect to the third bearing 23a.

The hollow disk-shaped wheel accommodating portion 21c rotatably accommodates the worm wheel 25. The wheel accommodating portion 21c is integrally formed in the worm accommodating portion 21b. The wheel accommodating portion 21c is positioned in an opposite side to the connector portion 10c with respect to the worm accommodating portion 21b. An internal space of the wheel accommodating portion 21c is connected to an internal space of the worm accommodating portion 21b in a center portion of the worm accommodating portion 21b. The worm shaft 24 is engaged with the worm wheel 25. An output shaft 26 is coupled to a center portion of the worm wheel 25 in such a manner as to integrally rotate. The output shaft 26 is coupled to a known window regulator (not shown) for ascending and descending a window glass (not shown). The window regulator corresponds to a load portion with respect to the motor apparatus 1.

As shown in FIG. 2, the clutch 30 is provided with a collar 31, a driven rotor 32, three rollers 33, a support member 34, a stopper 35, a drive rotor 36, and a thrust ball 37. The driven rotor 32 is integrally provided in the worm shaft 24. The drive rotor 36 is installed to the coupling portion 7a.

The cylindrical collar 31 made of metal is accommodated in the worm accommodating portion 21b. The worm accommodating portion 21b has a clutch accommodating recess 21d directed to the motor main body 2. The collar 31 is press fitted to the clutch accommodating recess 21d. The collar 31 can not be rotated in a circumferential direction with respect to an inner circumferential surface of the clutch accommodating recess 21d. The collar 31 has a flange 31a extending from an end portion directed to the motor main body 2.

Figure 4:
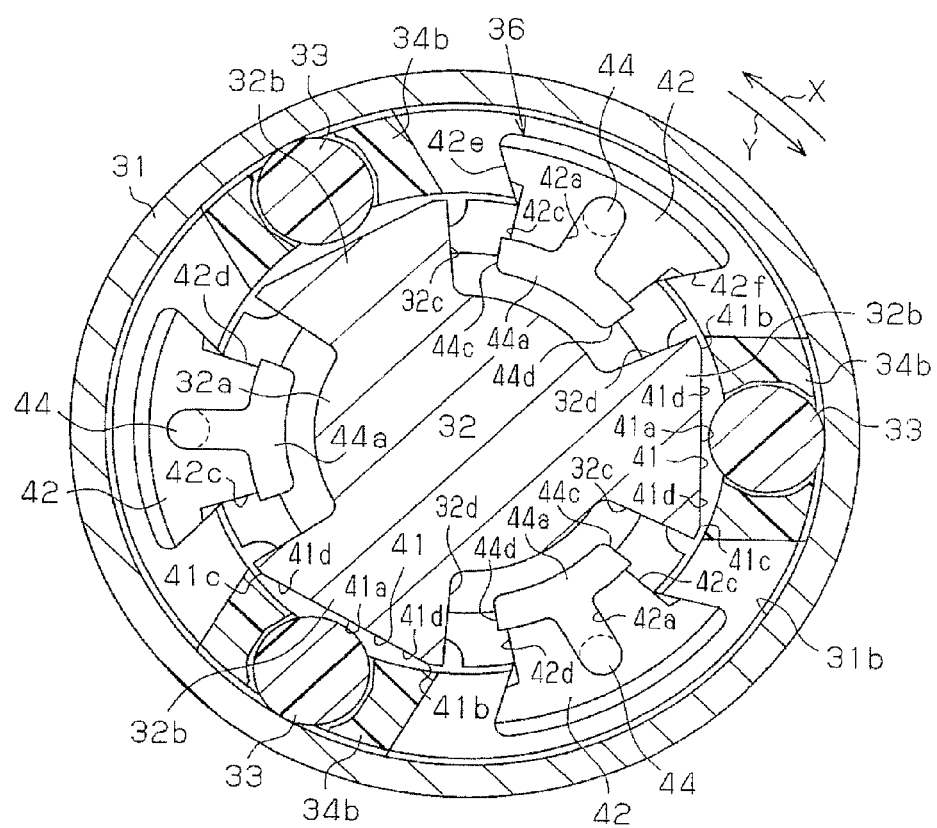
FIG. 4 is a cross-sectional view taken along line 4-4 in FIG. 2.

The collar 31 accommodates the driven rotor 32. As shown in FIGS. 2 and 4, the driven rotor 32 has a columnar portion 32a extending in an axial direction, and three driven projections 32b extending to an outer side in a radial direction from the columnar portion 32a. The columnar portion 32a extends toward the motor main body 2 from the worm shaft 24. Three driven projections 32b are formed at an interval of 120 degrees in a circumferential direction. As shown in FIG. 4, each of the driven projections 32b is formed in a sectoral shape, and a dimension in a radial direction of the driven projection 32b is larger toward an outer side in the radial direction. Each of the driven projections 32b has a first driven surface 32c corresponding to an end in a clockwise direction, and a second driven surface 32d corresponding to an end in a counterclockwise direction. An outer surface in the radial direction of the driven projection 32b serves as a control surface 41. The control surface 41 corresponds to a flat surface which is perpendicular to the radial direction. The control surface 41 has a first circumferential end 41b corresponding to an end in the counterclockwise direction, and a second circumferential end 41c corresponding to an end in the clockwise direction. A distance between the control surface 41 and the collar inner circumferential surface 31b is different over a rotational direction. A center portion of the control surface 41 with regard to the circumferential direction is called as an unlocking portion 41a. A distance between the unlocking portion 41a and the collar inner circumferential surface 31b is larger than the distance between the first circumferential end 41b and the collar inner circumferential surface 31b. The distance between the first circumferential end 41b and the collar inner circumferential surface 31b is equal the distance between the second circumferential end 41c and the collar inner circumferential surface 31b.

As shown in FIG. 2, the thrust ball 37 is arranged between the driven rotor 32 and the coupling portion 7a. The driven rotor 32 has a contact member 24a brought into point contact with the thrust ball 37. The contact member 24a is made of a quenched metal material. A hardness of the contact member 24a is higher than the driven rotor 32. Accordingly, it is possible to suppress an excessive contact abrasion between the driven rotor 32 and the thrust ball 37.

As shown in FIG. 4, a resin roller 33 is arranged between each of the control surfaces 41 and the collar inner circumferential surface 31b. The roller 33 is formed in a columnar shape extending in an axial direction. The diameter of each of the roller 33 is smaller than the distance between the unlocking portion 41a and the collar inner circumferential surface 31b. The diameter of the roller 33 is larger than the interval between the first circumferential end 41b and the collar inner circumferential surface 31b. The control surface 41 has a pair of locking portions 41d. A distance between the locking portion 41d and the collar inner circumferential surface 31b is equal to the diameter of the roller 33. A pair of locking portions 41d is positioned between the first circumferential end 41b and the unlocking portion 41a, and between the second circumferential end 41c and the unlocking portion 41a.

As shown in FIGS. 2 and 4, a ring portion 34a of the support member 34 runs on the flange 31a of the collar 31. An outer diameter of the ring portion 34a is larger than an inner diameter of the collar 31. The support member 34 has three holding portions 34b extending in the axial direction from the ring portion 34a, and three coupling pieces 34c extending in the circumferential direction. Three holding portions 34b are arranged at an interval of 120 degrees. Each of the holding portions 34b holds each of the rollers 33 between the control surface 41 and the collar inner circumferential surface 31b. Each of the holding portions 34b allows each of the rollers 33 to rotate. The holding portion 34b has an arcuate shape around the axis of the worm shaft 24. Each of the coupling pieces 34c maintains the interval between the holding portions 34b by coupling the holding portions 34b adjacent to each other in the circumferential direction. As shown in FIG. 2, each of the coupling pieces 34c is positioned between the collar 31 and the driven rotor 32.

As shown in FIG. 2, a plate-shaped stopper 35 is fixed to the gear housing 21. The stopper 35 regulates a movement in the axial direction of the support member 34 and the collar 31. The stopper 35 is positioned between the support member 34 and the sensor magnet 13. A center portion of the stopper 35 has an insertion hole 35a, into which the drive rotor 36 is inserted. The stopper 35 has a plurality of restricting portions brought into contact with the flange 31a of the collar 31. The restricting portion 35b is positioned in an outer side in the radial direction with respect to the insertion hole 35a. The restricting portion 35b is formed by cutting up a part of the plate member constructing the stopper 35.

Figure 3A:
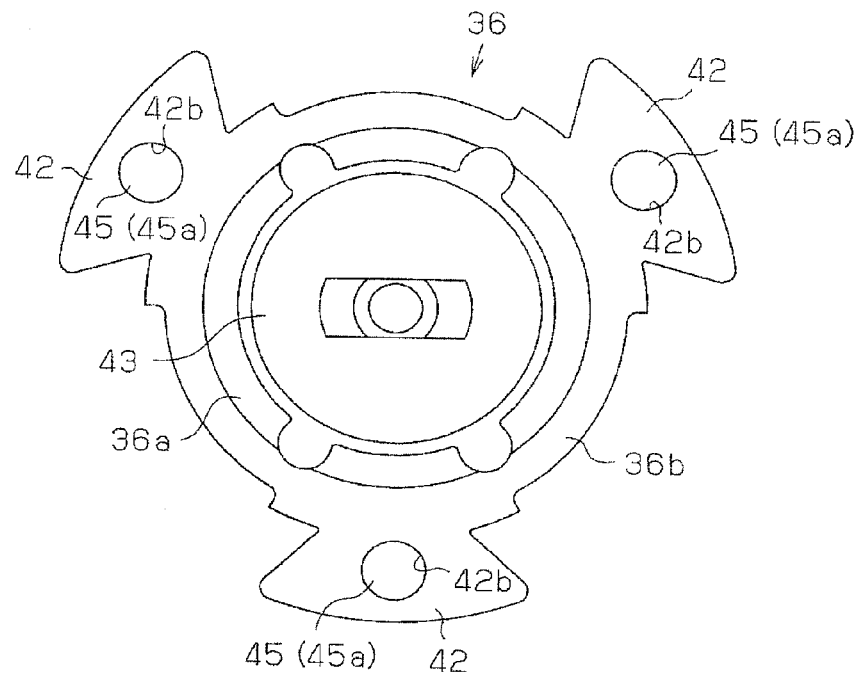
FIG. 3A is a plan view of a drive rotor shown in FIG. 2.

As shown in FIGS. 2 and 3A, the resin drive rotor 36 is arranged in the inner side of the collar 31. The drive rotor 36 is provided with a drive disk 36b which is adjacent to the driven rotor 32, and a drive cylinder 36a which extends toward the support member 14 from the drive disk 36b. A diameter of the drive disk 36b is larger than the diameter of the drive cylinder 36a. A center portion of the drive disk 36b has a ball accommodating hole 36d, and a ball holding portion 36c surrounding the ball accommodating hole 36d. The ball holding portion 36c holds the thrust ball 37. Each of the coupling portion 7a and the contact member 24a is brought into contact with the thrust ball 37. In other words, the coupling portion 7a and the contact member 24a hold the thrust ball 37 from both sides in the axial direction. The thrust ball 37 is exposed from the drive disk 36b in both directions in the axial direction. The metal thrust ball 37 has been previously quenched for increasing the hardness.

A center portion of the drive rotor 36 has a coupling hole 36e extending in an axial direction in such a manner as to be communicated with the ball accommodating hole 36d. The coupling hole 36e extends toward the ball holding portion 36c from the drive cylinder 36a. The drive rotor 36 has a pair of parallel surfaces defining the coupling hole 36e. The parallel surfaces serve as a coupled portion to the coupling portion 7a. The coupling portion 7a is loosely fitted to the coupling hole 36e. Accordingly, the drive rotor 36 can be integrally rotated with the rotary shaft 7. The coupling hole 36e is larger than the coupling portion 7a in such a manner that a gap S is generated between the parallel surfaces of the coupling hole 36e and the coupling portion 7a.

The gap S allows the drive rotor 36 to be deviated from the rotary shaft 7, that is, be axially deviated, at a time of assembling the motor apparatus 1, that is, assembling each of the parts of the motor apparatus 1. Accordingly, it is possible to suppress an increase of the load in the radial direction applied to the drive rotor 36 and the rotary shaft 7. Therefore, it is possible to suppress an abnormal noise and a vibration generated at a time of driving the motor apparatus 1. A distal end surface of the coupling portion 7a is brought into point contact with the thrust ball 37. The contact member 24a is also brought into point contact with the thrust ball 37. Accordingly, it is possible to allow the first axis L1 to be inclined with respect to the second axis L2. As a result, an excessive load is not applied to the rotary shaft 7 and the contact member 24a.

Figure 3B:
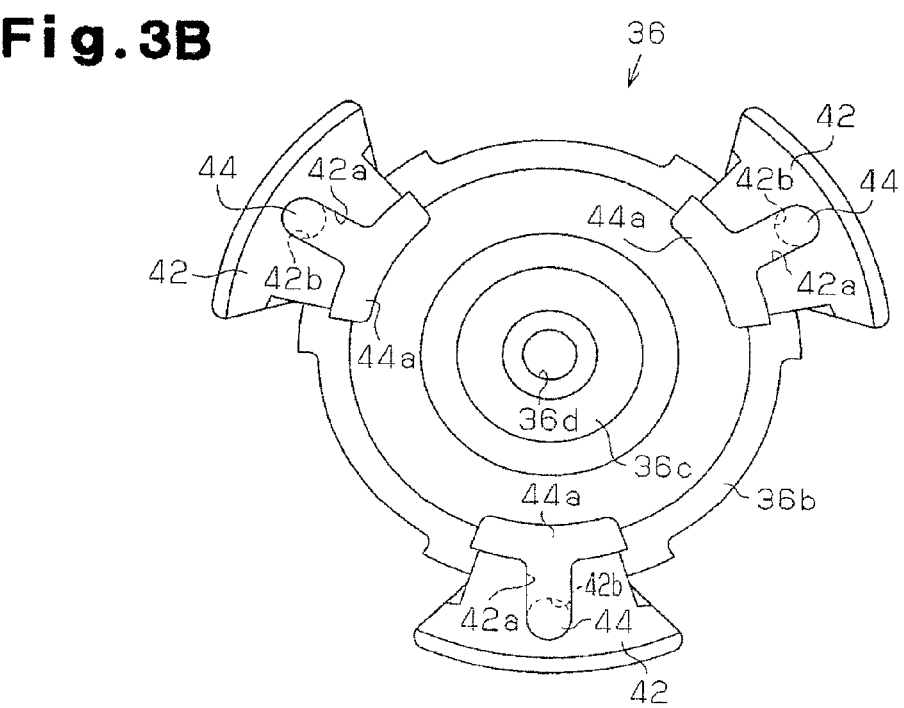
FIG. 3B is a bottom elevational view of the drive rotor in FIG. 3A.

As shown in FIGS. 3A, 3B and 4, an outer circumferential portion of the drive disk 36b has three drive projections 42 at a uniform angular interval. Each of the drive projections 42 extends in an axial direction toward the worm shaft 24. As seen from the axial direction, each of the drive projections 42 is formed in a sectoral shape. In other words, as shown in FIG. 4, each of the drive projections 42 has a first drive surface 42c directed in a counterclockwise direction, and a first pressing surface 42e protruding to an outer side in the radial direction than the first drive surface 42c and in the counterclockwise direction. Further, each of the drive projections 42 has a second drive surface 42d directed in a clockwise direction, and a second pressing surface 42f protruding to an outer side in the radial direction than the second drive surface 42d and in the clockwise direction. Each of the first drive surface 42c and the second drive surface 42d is perpendicular to the circumferential direction.

Each of the drive projections 42 has an arcuate surface directed to the collar inner circumferential surface 31b. In other words, the arcuate surface is directed to the outer side in the radial direction. A radius of curvature of the arcuate surface is slightly smaller than a radius of curvature of the collar inner circumferential surface 31b.

As shown in FIG. 4, each of the drive projections 42 has a fitting groove 42a extending in a radial direction, and a filling hole 42b extending in an axial direction from the fitting groove 42a. The filling hole 42b is positioned in a center portion of the drive projection 42. The fitting groove 42a extends to an inner side in the radial direction from the filling hole 42b. Each of the drive projections 42 is accommodated in the collar 31. Each of the drive projections 42 is positioned between a pair of driven projections 32b which are adjacent to each other in the circumferential direction. Further, each of the drive projections 42 is positioned between a pair of rollers 33 which are adjacent to each other in the circumferential direction. In other words, each of the drive projections 42 is positioned between a pair of holding portions 34b which are adjacent to each other in the circumferential direction.

As shown in FIG. 2, the drive rotor 36 has an insert molded metal reinforcing plate 39. Accordingly, the rigidity of the drive rotor 36 is increased. The drive cylinder 36a has an elastic holding portion 43 which is adjacent to the support member 14. The elastic holding portion 43 is made of an annular elastomer resin. The elastic holding portion 43 is fitted to an opening of the coupling hole 36e directed to the support member 14.

An inner diameter of the annular elastic holding portion 43 is smaller than a diameter of the coupling hole 36e. The coupling portion 7a is press fitted to the hole of the elastic holding portion 43. In other words, the elastic holding portion 43 is pressure contacted with the coupling portion 7a. Accordingly, the elastic holding portion 43 prevents the drive rotor 36 from falling away from the rotary shaft 7. The elastically deformable elastic holding portion 43 allows the drive rotor 36 to be axially deviated from the rotary shaft 7.

The elastic holding portion 43 protrudes toward the support member 14 from the drive cylinder 36a. In other words, the elastic holding portion 43 has a first buffering projection 43a protruding from the drive cylinder 36a. The first buffering projection 43a serves as an elastic member. The elastic holding portion 43 has an accommodating recess 43b directed to the support member 14. The accommodating recess 43b accommodates a part of the fixed tube 14a. A diameter of the accommodating recess 43b is larger than an outer diameter of the fixed tube 14a. As shown in FIG. 2, the fixed tube 14a is displaced from a bottom surface of the accommodating recess 43b in a state in which the first axis L1 is not deviated from the second axis L2.

As shown in FIG. 3B, the drive rotor 36 has three buffering portions 44 which are the same number as the number of the fitting grooves 42a. Each of the buffering portions 44 is fitted to the corresponding fitting groove 42a. Each of the buffering portions 44 is made of an elastomer resin. Each of the buffering portions 44 is connected to the elastic holding portion 43 through a through hole (not shown) which each of the drive rotor 36 has. Each of the buffering portions 44 has a buffering piece 44a extending in the circumferential direction. The buffering piece 44a is brought into contact with the drive projection 42 in an inner side in the radial direction than the fitting groove 42a. As shown in FIG. 4, each of the buffering pieces 44a has a first buffering end 44c corresponding to an end in a counterclockwise direction, and a second buffering end 44d corresponding to an end in a clockwise direction. This distance between the first buffering end 44c and the second buffering end 44d is slightly larger than a dimension in the circumferential direction of an inner end in the radial direction of the drive projection 42.

As shown in FIG. 2, a filling portion 45 made of an elastomer resin is filled in the filling hole 42b. The columnar filling portion 45 has a diameter which is equal to an inner diameter of the filling hole 42b. The filling portion 45 protrudes toward the sensor magnet 13 from the drive projection 42. In other words, each of the filling portions 45 has a second buffering projection 45a protruding toward the sensor magnet 13 from the drive projection 42. The second buffering projection 45a serves as a second elastic member. In the case that the first axis L1 agrees with the second axis L2, all the second buffering projections 45a are displaced from the restricting surface 13a of the sensor magnet 13.

A description will be given below of an operation of the motor apparatus 1 having the structure mentioned above.

As shown in FIG. 4, in the case that the drive rotor 36 is rotated in the counterclockwise direction, that is, in a direction X with respect to the driven rotor 32, the first drive surface 42c and the first buffering end 44c are integrally rotated in the direction X. The first drive surface 42c is brought into contact with the first driven surface 32c. As a result, the drive rotor 36 and the driven rotor 32 are engaged with each other, and are integrally rotated in the direction X. The first buffering end 44c is brought into contact with the first driven surface 32c just before the first drive surface 42c is brought into contact with the first driven surface 32c. As a result, the first buffering end 44c collapses. Accordingly, it is possible to absorb an impact generated by a collision of the first drive surface 42c with the first driven surface 32c.

On the contrary, in the case that the drive rotor 36 is rotated in the clockwise direction, that is, in a direction Y with respect to the driven rotor 32, the second drive surface 42d and the second buffering end 44d are integrally rotated in the direction Y. The second drive surface 42d is brought into contact with the second driven surface 32d. As a result, the drive rotor 36 and the driven rotor 32 are engaged with each other, and are integrally rotated in the direction Y. The second buffering end 44d is brought into contact with the second driven surface 32d just before the second drive surface 42d is brought into contact with the second driven surface 32d. As a result, the second buffering end 44d collapses. Accordingly, it is possible to absorb an impact generated by a collision of the second drive surface 42d with the second driven surface 32d.

Figure 5:
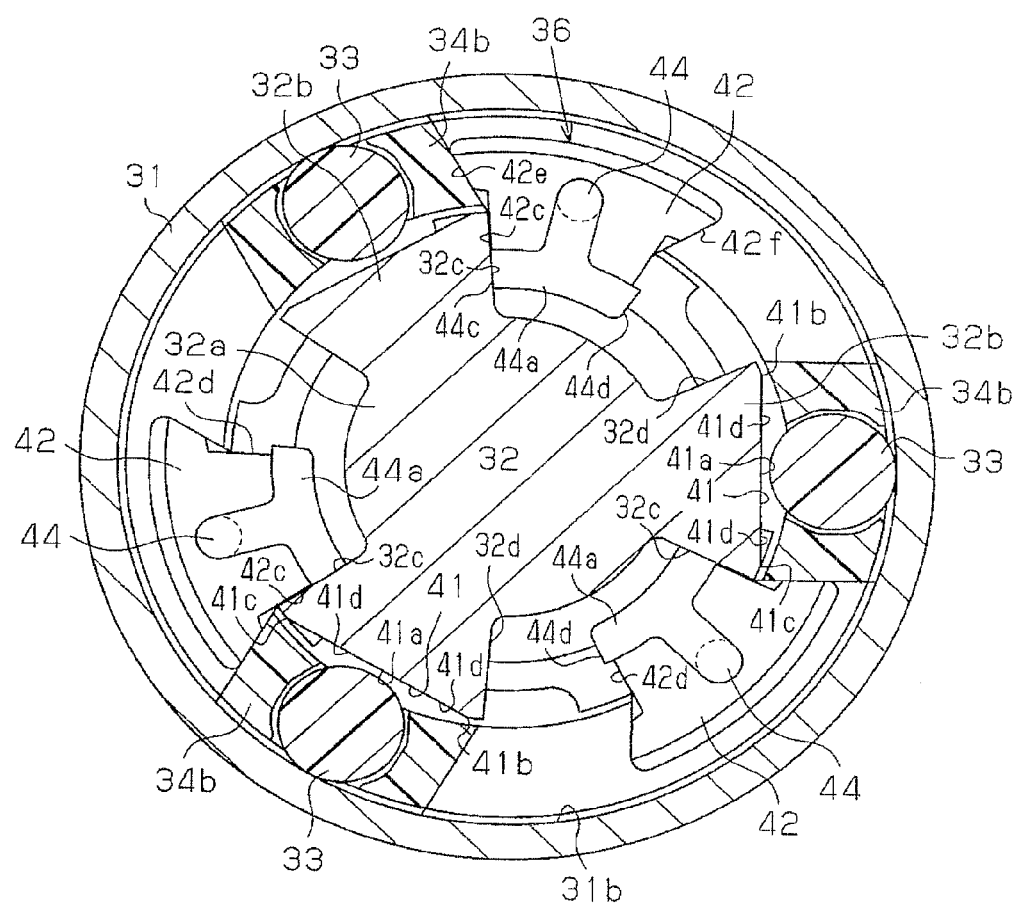
FIG. 5 is a cross-sectional view of a clutch in FIG. 4 in a rotation allowing state.

FIG. 5 shows a first unlocked drive state. In the first unlocked drive state, the first drive surface 42c is brought into contact with the first driven surface 32c, and the first pressing surface 42e is brought into contact with the holding portion 34b.

In a second unlocked drive state (not shown), the second drive surface 42d is brought into contact with the second driven surface 32d, and the second pressing surface 42f is brought into contact with the holding portion 34b.

A shape and a dimension of each of the drive projection 42, the driven projection 32b, the roller 33 and the holding portion 34b are determined in such a manner that the roller 33 is positioned at the unlocking portion 41a, in each of the first unlocked drive state and the second unlocked drive state.

A description will be given of a case that the rotary shaft 7 is rotated in the direction X in FIG. 4. If the motor main body 2 is driven, the rotary shaft 7 and the drive rotor 36 are integrally rotated in the direction X. As shown in FIG. 5, since the first drive surface 42c is brought into contact with the first driven surface 32c, the drive rotor 36 and the driven rotor 32 are in the engaged state. When the first drive surface 42c is brought into contact with the first driven surface 32c, the first pressing surface 42e is brought into contact with the holding portion 34b. Accordingly, the roller 33 is next to the unlocking portion 41a. In other words, the control surface 41 and the collar inner circumferential surface 31b do not hold the roller 33. Therefore, the clutch 30 comes to the unlocked state. As a result, the driven rotor 32 is rotatable.

If the drive rotor 36 is rotated in the direction X, the rotation is transmitted to the driven rotor 32 from the drive projection 42, and the drive rotor 36 is rotated in the direction X.

Although an illustration is omitted, the roller 33 is in the unlocked state and the driven rotor 32 is rotated in the direction Y, even in the case that the rotary shaft 7 is rotated in the direction Y.

If the rotation of the rotary shaft 7 is transmitted to the drive rotor 36, the driven rotor 32 and the worm shaft 24, the worm wheel 25 and the output shaft 26 are rotated. As a result, the window regulator is actuated, and the window glass is opened and closed.

Figure 6:
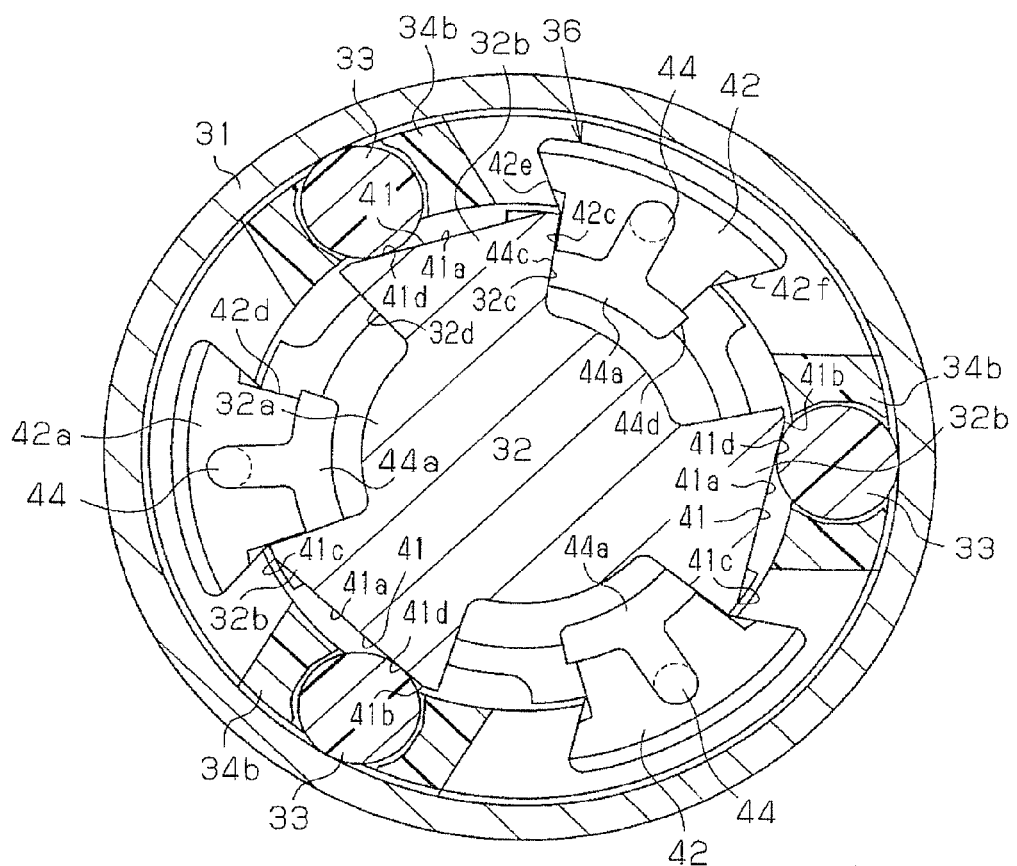
FIG. 6 is a cross-sectional view of the clutch in FIG. 4 in a rotation restricting state.

Next, a description will be given of a case that the rotation is transmitted to the output shaft 26 from the load portion, that is, the window glass in a state in which the motor apparatus 1 is stopped. In other words, a description will be given of a case that the driven rotor 32 is rotated slightly in the direction X or the direction Y in the state in which the drive rotor 36 is stopped. For example, as shown in FIG. 6, in the case that the driven rotor 32 is slightly rotated in the direction Y, the locking portion 41d and the collar inner circumferential surface 31b hold the roller 33. The first drive surface 42c is brought into contact with the first driven surface 32c, however, the first pressing surface 42e is displaced from the holding portion 34b. As a result, the driven rotor 32 comes to the locked state, and can not rotate in the direction Y any more.

Although an illustration is omitted, even in the case that the driven rotor 32 is slightly rotated in the direction X in a state in which the motor apparatus 1 is stopped, the locking portion 41d and the collar inner circumferential surface 31b hold the roller 33. As a result, the driven rotor 32 comes to the locked state, and cannot rotate in the direction X any more. Accordingly, even if the load due to its own weight and the vibration at a time when the vehicle travels is applied to the window glass, the clutch 30 inhibits the rotation of the driven rotor 32. Accordingly, it is possible to inhibit the rotation of the output shaft 26. In other words, it is possible to inhibit the window glass from descending in the state in which the motor apparatus 1 is stopped.

Figure 7:
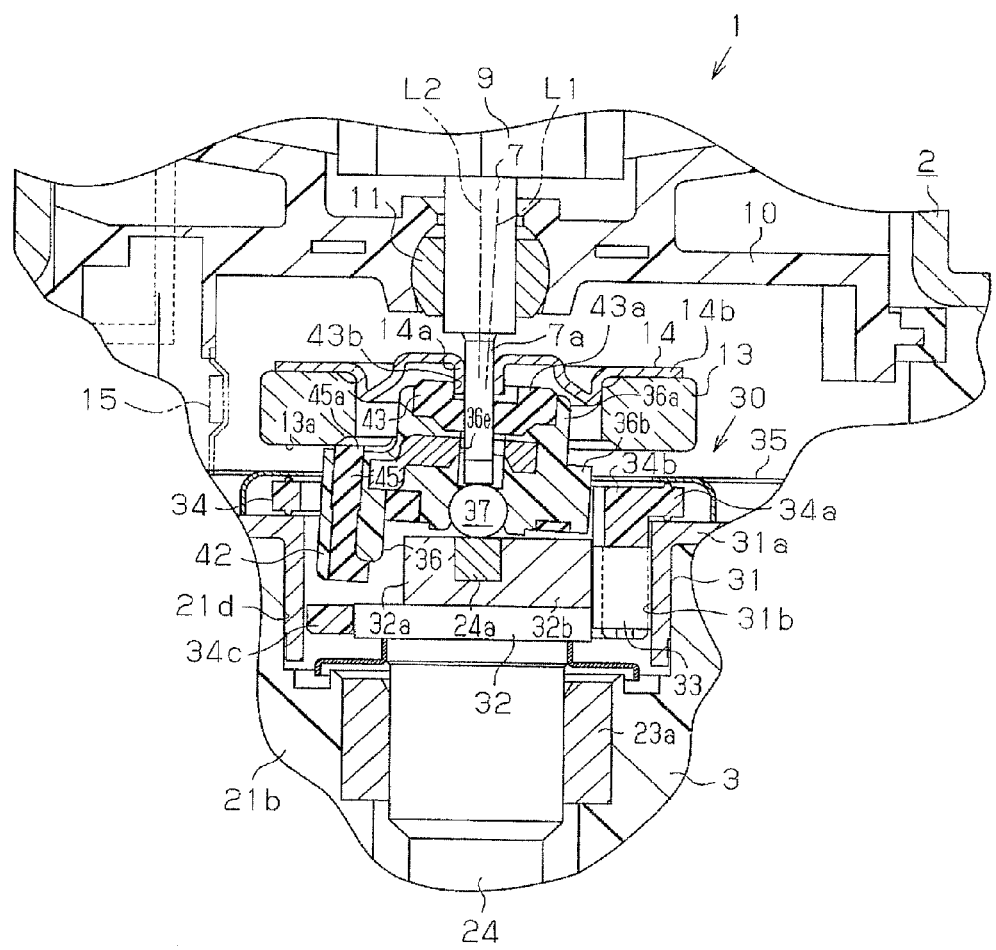
FIG. 7 is a cross-sectional view of a state in which the drive rotor shown in FIG. 2 is inclined with respect to a rotary shaft.

As shown in FIG. 7, since the coupling portion 7a is loosely fitted to the coupling hole 36e, the drive rotor 36 is allows to be inclined with respect to the rotary shaft 7. In a state in which the drive rotor 36 is inclined with respect to the rotary shaft 7, the second buffering projection 45a in the drive rotor 36 is brought into contact with the restricting surface 13a of the sensor magnet 13. In other words, the sensor magnet 13 inhibits the drive rotor 36 from being further inclined with respect to the rotary shaft 7.

Further, in the state in which the drive rotor 36 is inclined with respect to the rotary shaft 7 as shown in FIG. 7, an inner circumferential surface of the accommodating recess 43b in the first buffering projection 43a is brought into contact with the fixed tube 14a of the support member 14. Accordingly, it is possible to suppress an excessive inclination of the drive rotor 36.

The present embodiment has the following advantages.

(1) The sensor magnet 13 attached to the coupling portion 7a is brought into contact with the drive rotor 36 inclined with respect to the rotary shaft 7. Accordingly, it is possible to inhibit the drive rotor 36 from being inclined any more. Therefore, in the structure in which the coupling portion 7a is loosely fitted to the coupling hole 36e so as to allow the drive rotor 36 to be deviated from the rotary shaft 7, it is possible to suppress an excessive inclination of the drive rotor 36. As a result, it is possible to inhibit a excessive looseness from being generated in the coupling portion between the rotary shaft 7 and the worm shaft 24. Accordingly, it is possible to suppress the vibration and the abnormal noise of the motor apparatus 1.

(2) The first buffering projection 43a and the second buffering projection 45a are arranged between the drive rotor 36 and the rotary shaft 7 which come close to each other in the case that the drive rotor 36 is inclined with respect to the rotary shaft 7. In other words, the first buffering projection 43a and the second buffering projection 45a inhibit the inclined drive rotor 36 from being directly brought into contact with the sensor magnet 13 and the rotary shaft 7.

Accordingly, in the case that the drive rotor 36 is inclined with respect to the rotary shaft 7, the first buffering projection 43a in the drive rotor 36 is brought into contact with the fixed tube 14a in the rotary shaft 7. Further, the second buffering projection 45a in the drive rotor 36 is brought into contact with the restricting surface 13a of the sensor magnet 13.

In other words, it is possible to prevent the drive projection 42 having no elasticity from being directly brought into contact with the sensor magnet 13. Accordingly, the first buffering projection 43a and the second buffering projection 45a absorb the noise and the vibration which may be generated by the drive rotor 36 being brought into contact with the sensor magnet 13 and the support member 14. As a result, it is possible to suppress an increase of the noise and the vibration of the motor apparatus 1.

The first and second buffering projections 43a and 45a can be elastically deformed. Accordingly, the first buffering projection 43a and the second buffering projection 45a after being brought into contact with the sensor magnet 13 are respectively restored on the basis of their elastic force, whereby it is possible to make a degree of inclination of the drive rotor 36 with respect to the rotary shaft 7 further smaller.

(3) The first buffering projection 43a and the second buffering projection 45a are integrally formed in the drive rotor 36. Accordingly, it is possible to prevent an assembling manhour in the motor apparatus 1 from being increased.

(4) The sensor magnet 13 for detecting the rotation of the rotary shaft 7 serves as a restricting member restricting the inclination of the drive rotor 36. Accordingly, it is possible to prevent a number of the parts and the number of assembling steps of the motor apparatus 1 from being increased.

The embodiment mentioned above may be modified as follows.

Figure 8A:
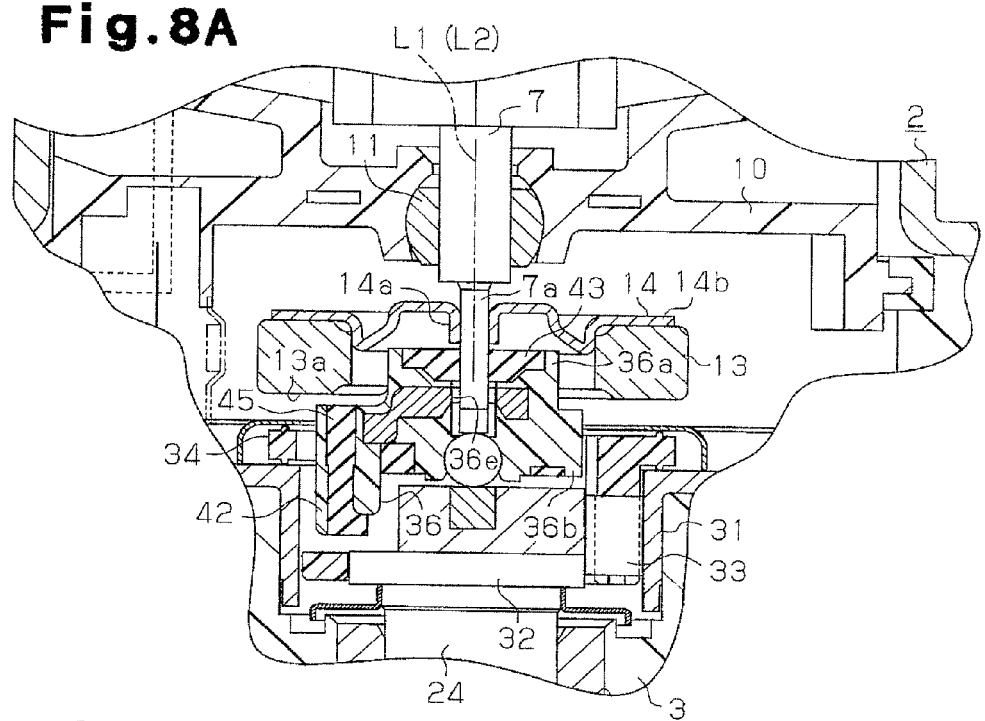
FIG. 8A is a cross-sectional view of a portion near a clutch in a motor apparatus in accordance with another embodiment of the present invention.
Figure 8B:
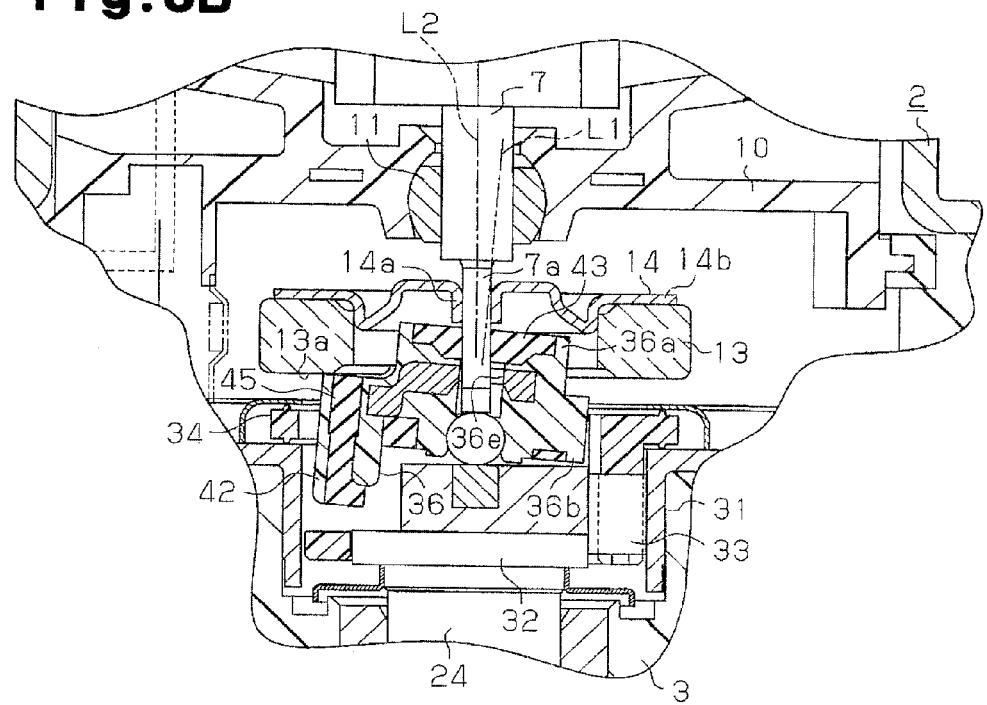
FIG. 8B is a cross-sectional view of a state in which a drive rotor shown in FIG. 8A is inclined with respect to a rotary shaft.

As shown in FIG. 8A, it is possible to delete both of the first buffering projection 43a in the elastic holding portion 43, and the second buffering projection 45a in the filling portion 45. In other words, the elastic holding portion 43 is flush with the drive cylinder 36a. The filling portion 45 is flush with the drive projection 42. As shown in FIG. 8B, in the case that the drive rotor 36 is deviated from the rotary shaft 7, the drive projection 42 of the drive rotor 36 is brought into contact with the restricting surface 13a of the sensor magnet 13. Accordingly, it is possible to inhibit the drive rotor 36 from being inclined any more. Therefore, it is possible to suppress an excessive inclination of the drive rotor 36.

The drive rotor 36 may be provided with only one of the first buffering projection 43a and the second buffering projection 45a.

The first buffering projection 43a and the second buffering projection 45a are not limited to be integrally formed in the drive rotor 36. The first buffering projection 43a and the second buffering projection 45a independently provided from the drive rotor 36 may be integrally formed with the drive rotor 36 by being assembled in the drive rotor 36.

The first buffering projection 43a and the second buffering projection 45a may be replaced by other elastic members provided at a position with which the drive rotor 36 is brought into contact in the sensor magnet 13 and the support member 14.

Figure 9A:
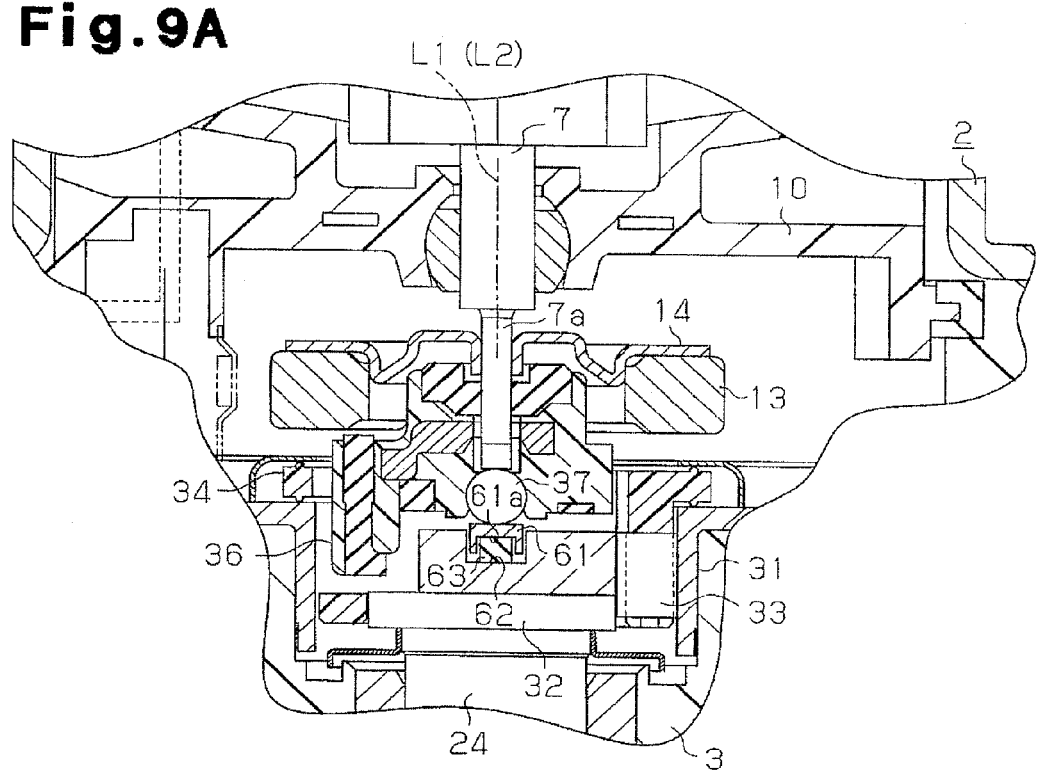
FIG. 9A is a cross-sectional view of a portion near a clutch in a motor apparatus in accordance with another embodiment of the present invention.

As shown in FIG. 9A, a cushion member 63 may be arranged between the driven rotor 32 and the thrust ball 37. The driven rotor 32 has an accommodating recess 62 accommodating the cushion member 63. The rectangular parallelepiped cushion member 63 having elasticity is arranged between a contact member 61 with which the thrust ball 37 is brought into contact, and a bottom surface of the accommodating recess 62. The accommodating recess 62 also accommodates the contact member 61. The contact member 61 has a support recess 61a accommodating about one half of the cushion member 63. The cushion member 63, for example, made of a rubber is assembled in the motor apparatus 1 in a state of being compressed in the axial direction of the rotary shaft 7. In other words, a restoring force of the cushion member 63 presses the rotary shaft 7 and the worm shaft 24 in a direction displacing from each other along the axial direction. Accordingly, it is possible to suppress the excessive looseness in the axial direction of the rotary shaft 7 and the worm shaft 24 in the motor apparatus 1.

Figure 9B:
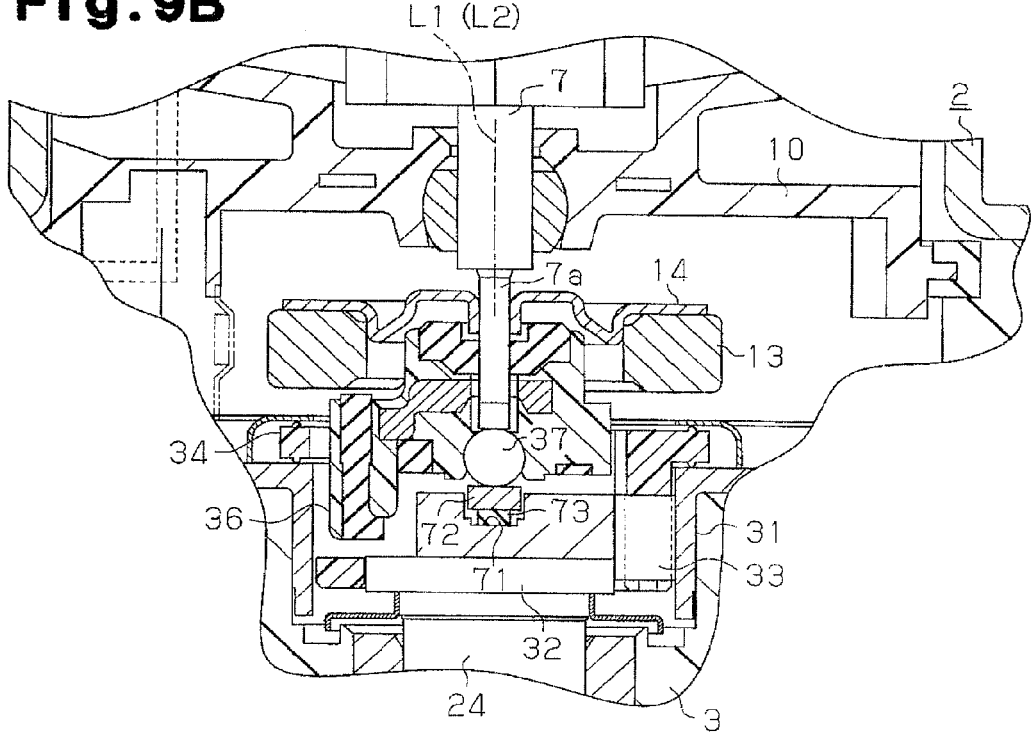
FIG. 9B is a cross-sectional view of a state in which a drive rotor shown in FIG. 9A is inclined with respect to a rotary shaft.
Figure 10A:
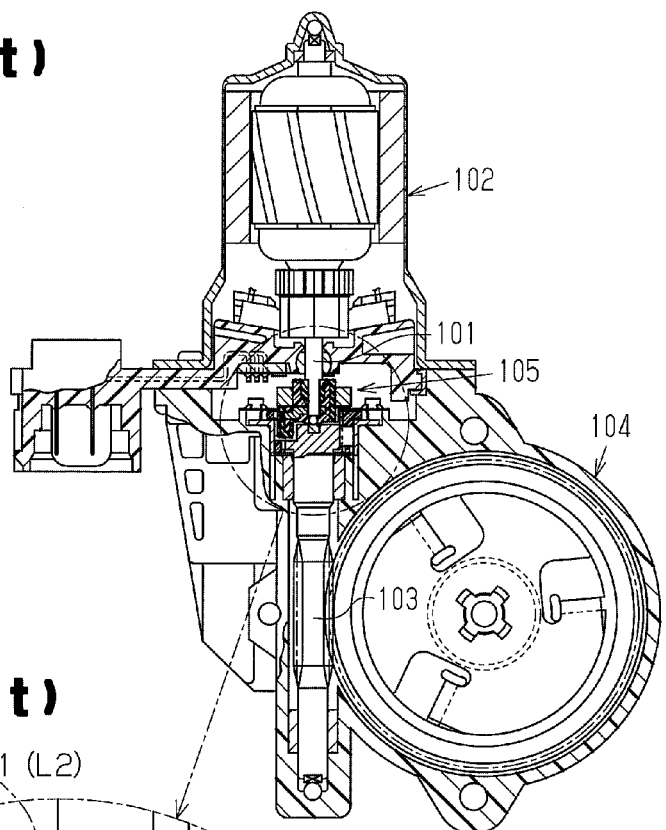
FIG. 10A is a cross-sectional view of a typical motor apparatus.
Figure 10B:
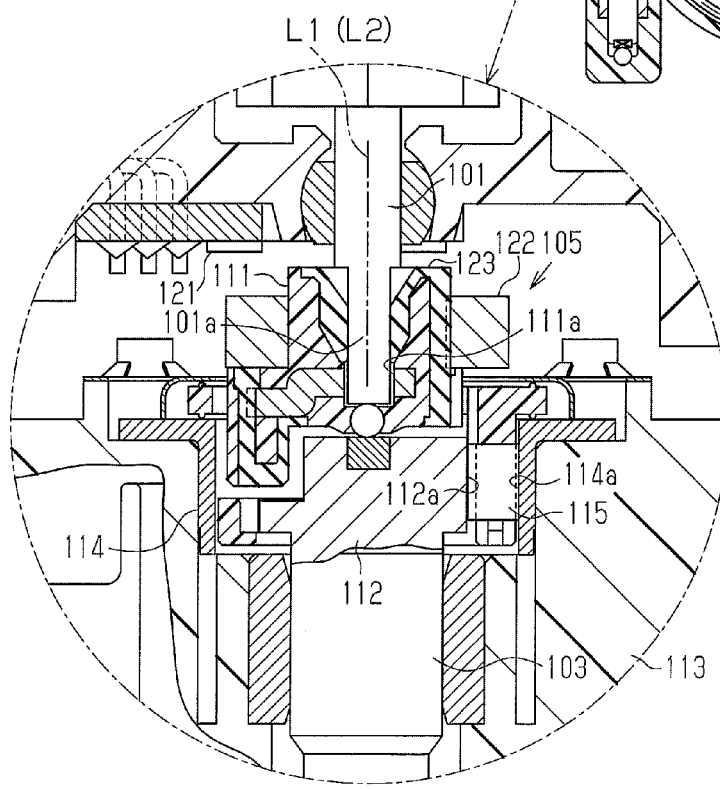
FIG. 10B is an enlarged view of a peripheral portion of a cutch shown in FIG. 10A.

As shown in FIG. 9B, the contact member 72 may be formed in a rectangular parallelepiped shape. A rectangular parallelepiped cushion member 73 is arranged between a bottom surface of an accommodating recess 71, and the contact member 72. The rectangular parallelepiped contact member 72 shown in FIG. 9B is easily formed in comparison with the contact member 61 shown in FIG. 9A.

The cushion members 63 and 73 are not limited to be arranged between the rotary shaft 7 and the worm shaft 24, but may be arranged between the bottom portion of the yoke 4 and the rotary shaft 7. Further, the cushion members 63 and 73 may be arranged between the bottom portion of the worm accommodating portion 21b and the worm shaft 24. In these cases, it is possible to further suppress the excessive looseness in the axial direction of the rotary shaft 7 and the worm shaft 24.

The restricting member restricting the inclination of the drive rotor 36 is not limited to the sensor magnet 13. The restricting member may be constituted by any member which is provided in the rotary shaft 7 so as to be integrally rotatable, in such a manner that the restricting member can be brought into contact with the inclined drive rotor 36. As the restricting member, for example, a disk-shaped plate may be fixed to the rotary shaft 7.

Further, the commutator 9 may be used as the restricting member. The commutator 9 is arranged in the rotary shaft 7 in such a manner as to be brought into contact with the inclined drive rotor 36. Further, the support member 14 may be used as the restricting member. The support plate 14b of the support member 14 is arranged in the rotary shaft 7 so as to face the drive rotor 36.

The structure of the clutch 30 may be appropriately changed. In other words, the clutch 30 is not limited to the structure which prevents the rotation of the load portion from being transmitted to the drive rotor 36 from the driven rotor 32, by locking the driven rotor 32 against rotation. For example, the clutch may be structured such as to allow the rotation of the driven rotor 32 while applying a predetermined friction force to the collar inner circumferential surface 31b from the roller 33.

The driven rotor 32 is not limited to be integrally formed in the worm shaft 24. The driven rotor 32 may be structured such as to be detachable from the worm shaft 24.

The structure of the coupling mechanism coupling the rotary shaft 7 to the worm shaft 24 is not limited to the clutch 30.

The motor apparatus 1 may be applied to the drive source of the other apparatus than the vehicle power window apparatus.

What is claimed is:

1. A motor apparatus comprising:
    a motor main body provided with a rotary shaft;
    a decelerating portion assembled in the motor main body, the decelerating portion having a worm shaft driven by the rotary shaft, and the worm shaft being coaxially arranged with the rotary shaft;
    a coupling portion provided in one end of the rotary shaft;
    a drive rotor having a coupled portion to which the coupling portion is loosely fitted, the drive rotor being integrally rotatable with the coupling portion;
    a driven rotor integrally rotating with the worm shaft, the driven rotor being engageable with the drive rotor with respect to a rotating direction of the drive rotor;
    a coupling mechanism including the drive rotor and the driven rotor; and
    a restricting member fixed to the rotary shaft so as to be integrally rotatable, the restricting member being contactable with the drive rotor in the case that the drive rotor is inclined with respect to the rotary shaft, wherein when the drive rotor is not inclined with respect to the rotary shaft, the restricting member does not contact the drive rotor,
    wherein the restricting member is a rotation detected portion fixed to the rotary shaft and the rotation detected portion integrally rotates with the rotary shaft for detecting a rotation of the rotary shaft.

2. The motor apparatus according to claim 1, further comprising an elastic member arranged between the drive rotor and the rotary shaft, which come close to each other in the case that the drive rotor is inclined with respect to the rotary shaft, wherein the elastic member is integrally formed in the drive rotor.

3. The motor apparatus according to claim 1,
    wherein the coupling mechanism includes a clutch capable of switching between a coupling state in which the rotation of the rotary shaft is transmitted to the driven rotor from the drive rotor, and a shutoff state of shutting off the transmission of the rotation from the drive rotor to the driven rotor, and wherein the clutch is structured such as to shut off the transmission of the rotation of the worm shaft from the driven rotor to the drive rotor.

4. The motor apparatus according to claim 1, further comprising a cushion member having elasticity, and the cushion member is arranged between the rotary shaft and the worm shaft in a state of being compressed in an axial direction.

5. The motor apparatus according to claim 1, wherein the rotation detected portion includes an annular sensor magnet and a support member, the support member supporting the sensor magnet with the coupling portion, wherein the drive rotor contacts with one of the sensor magnet and the support member in the case that the drive rotor is inclined with respect to the rotary shaft.

6. The motor apparatus according to claim 5, further comprising an elastic member arranged between the drive rotor and the support member, which come close to each other in the case that the drive rotor is inclined with respect to the rotary shaft.

7. The motor apparatus according to claim 5, further comprising an elastic member arranged between the drive rotor and the sensor magnet, which come close to each other in the case that the drive rotor is inclined with respect to the rotary shaft.

* * * * *